(12) United States Patent
Janz et al.

(10) Patent No.: US 6,865,603 B2
(45) Date of Patent: Mar. 8, 2005

(54) CORRECTING FOR NETWORK ADDRESS CHANGES

(75) Inventors: Susan M. Janz, Eagle, ID (US); Donald J. Gathman, Boise, ID (US); Burton H. Poppenga, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 756 days.

(21) Appl. No.: 09/773,973

(22) Filed: Jan. 31, 2001

(65) Prior Publication Data
US 2002/0103888 A1 Aug. 1, 2002

(51) Int. Cl.$^7$ .......................................... G06F 15/173
(52) U.S. Cl. ................... 709/223; 709/220; 709/221; 709/222; 709/225; 709/226; 709/227; 709/228
(58) Field of Search ................................. 709/200–254

(56) References Cited

U.S. PATENT DOCUMENTS 5,724,510 A * 3/1998 Arndt et al. ................. 709/220
5,835,720 A * 11/1998 Nelson et al. ............... 709/224
6,564,337 B1 * 5/2003 Yoneda et al. .................. 714/4

* cited by examiner

Primary Examiner—Nabil El-Hady

(57) ABSTRACT

A network address for an object device is corrected. A recorded network address and a recorded unique enduring identification for the object device are read from a record. The recorded network address is queried for a returned unique enduring identification. The recorded network address is queried by performing an SNMP Get call to the recorded network address or addressing a unique enduring identification query to the recorded network address and receiving the response to the query. The returned unique enduring identification is compared with the recorded unique enduring identification. Responsive to a mismatch between the returned unique enduring identification and the recorded unique enduring identification, a current network address for the object device is resolved and the recorded network address is replaced with the current network address.

19 Claims, 2 Drawing Sheets

CORRECTING FOR NETWORK ADDRESS CHANGES

FIELD OF THE INVENTION

This invention relates in general to communicating with devices on a network and, more particularly, to correcting network addresses in a list for devices on a network.

BACKGROUND OF THE INVENTION

Devices in a network environment communicate by directing information to network address of other devices. Each device has a unique network address to which information may be directed.

Occasionally, repeated communication with a list of devices in a network is desirable. Conventionally, the network address for each device on the list must be known to achieve the repeated communication. However, in some network environments, such as those using a dynamic host configuration protocol (DHCP), the network address of a device often changes.

If the network address of a device on the list changes, finding the new network address has been difficult, if not impossible. Furthermore, if a new device is assigned to one of the network addresses on the list, the new device may be mistaken for the device on the list, leading to confusion.

In a DHCP network, a central administrator, called a server, controls the assignment of network addresses to devices and keeps an index of the devices to which the network addresses have been assigned. This index designates the devices in the index by a hostname. The hostname is a unique name by which a device is known on a network.

Using hostnames instead of network addresses does not solve all problems associated with a repeated communication with a list of devices. For example, devices may be renamed or removed entirely from a network. In either case, confusion is likely to occur during the attempted communication with the devices on the list.

SUMMARY OF THE INVENTION

According to principles of the present invention, a recorded network address for an object device is corrected. A recorded network address and a recorded unique enduring identification for the object device are read from a record. The recorded network address is queried for a returned unique enduring identification. The returned unique enduring identification is compared with the recorded unique enduring identification. Responsive to a mismatch between the returned unique enduring identification and the recorded unique enduring identification, a current network address for the object device is resolved and the recorded network address is replaced with the current network address.

According to further principles of the present invention, the recorded network address is queried by performing an SNMP Get call to the recorded network address or addressing a unique enduring identification query to the recorded network address and receiving the response to the query.

According to further principles of the present invention, the current network address for the object device is resolved by either reading, from the record, a recorded hostname for the object device and retrieving the current network address for the recorded hostname or by reading, from the record, a recorded hardware address for the object device, sending a network multicast request for hardware addresses, receiving responses to the network multicast for hardware addresses, searching the responses for a response having a match to the recorded hardware address, and extracting the current network address from the response having a match to the recorded hardware address.

DETAILED DESCRIPTION OF THE INVENTION

Figure 1:
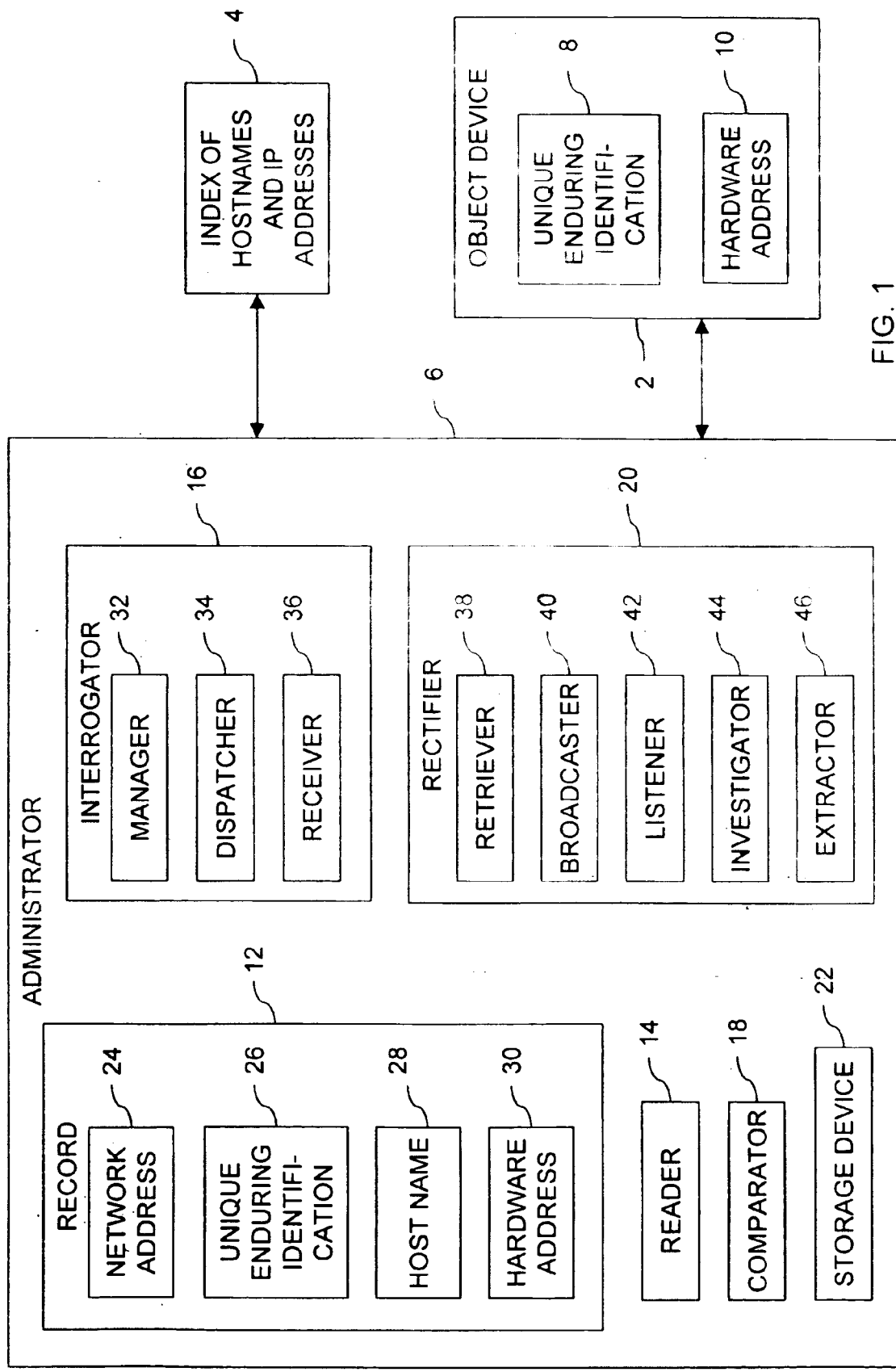
FIG. 1 is a block diagram representing one embodiment of the system of the present invention for correcting a network address for a device.

Illustrated in FIG. 1 are an object device 2, an index 4, and an administrator 6. Object device 2 is any device able to communicate with administrator 6 over a network. Object device 2 is assigned a network address by which administrator 6 is able to communicate with object device 2. Object device 2 includes a unique enduring identification 8. In one embodiment, unique enduring identification 8 is a serial number. In another embodiment, unique enduring identification 8 is a hardware address 10. Furthermore, unique enduring identification 8 may be a combination of a number and an address. FIG. 1 illustrates only one object device. However, any number of object devices may be served by the present invention.

Unique enduring identification 2 is any unique enduring identification assigned to object device 2 and known by object device 2. Likewise, hardware address 10 is any unique hardware address assigned to object device 2 and known by object device 2.

Index 4 is an index providing a network address for each hostname. For example, index 4 is an index, or list, maintained by a dynamic host configuration protocol (DHCP) server or DHCP administrator. Where necessary to the present invention, index 4 is accessible by administrator 6.

Administrator 6 is any combination of hardware and software, or executable code, for performing steps of the method of the present invention. Administrator 6 includes a record 12, a reader 14, an interrogator 16, a comparator 18, rectifier 20, and storage device 22.

Record 12 is any accumulation of information readable by administrator 6 and optionally stored on storage device 22. Record 12 includes, for at least one object device 2, a recorded network address 24 and a recorded unique enduring identification 26 and, optionally, a recorded host name 28 and a recorded hardware address 30. Each of the elements of information recorded in record 12 is referred to using the prefix "recorded" in order to distinguish it from other similarly named information.

Reader 14 is any combination of hardware and software configured to read, as necessary for object device 2, recorded IP address 24, recorded unique enduring identification 26, recorded hostname 28, and recorded hardware address 30.

Interrogator 16 is any combination of hardware and software configured to query recorded network address 24 for unique enduring identification 8, of object device 2. In one embodiment, investigator 16 includes a manager 32 configured to perform an SNMP Get call to the network address. In an alternate embodiment, interrogator 16 includes a dispatcher 34 configured to address a unique enduring identification query to recorded network address 24 and a receiver 36 configured to receive the response to the query.

Comparator 18 is any combination of hardware and software configured to compare returned unique enduring identification 8 with recorded unique enduring identification 26.

Rectifier 20 is any combination of hardware and software configured to respond to a mismatch between returned unique enduring identification 8 and recorded unique enduring identification 26, by finding a current network address for object device 2 and replacing recorded IP address 24 with the current network address. In one embodiment, rectifier 20 includes a retriever 38 configured to retrieve the current network address for recorded hostname 28. Retriever 38 retrieves the current network address from index 4.

In an alternate embodiment, rectifier 20 includes a broadcaster 40 configured to send a network multicast request for hardware addresses, a listener 42 configured to receive responses to the network multicast for hardware addresses 10, an investigator 44 configured to search the responses for a response having a match to recorded hardware address 30, and an extractor 46 configured to extract the current network address from the response having a match to recorded hardware address 30.

Storage device 22 is any device for storing data or executable code. Storage device 22 may also be a program storage device tangibly embodying a program, applet or instructions executable by administrator 6 for performing the method steps of the present invention executable by administrator 6. Storage device 22 may be any type of storage media such as magnetic, optical, or electronic storage media. Although depicted as integral to administrator 6, storage device 22 is alternatively embodied separate from administrator 6 and accessible by administrator 6.

Figure 2:
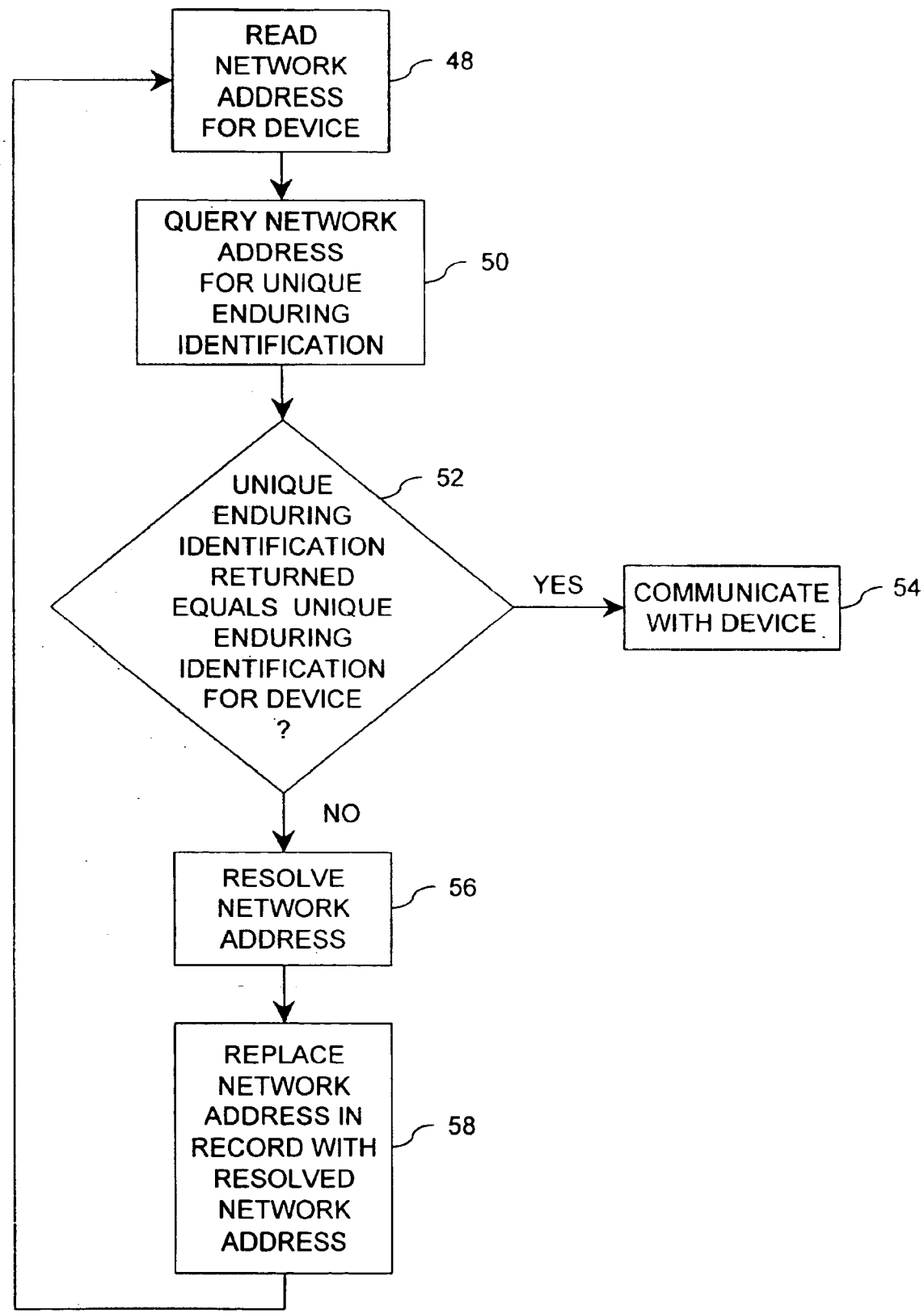
FIG. 2 is a flow chart illustrating one embodiment of the method of the present invention for correcting a network address for a device.

FIG. 2 is a flow chart representing steps of one embodiment of the present invention. Although the steps represented in FIG. 2 are presented in a specific order, the present invention encompasses variations in the order of steps. Furthermore, additional steps may be executed between the steps illustrated in FIG. 2 without departing from the scope of the present invention.

Recorded network address 24 is read 48 from record 12. Recorded network address 24 is then queried 50 for unique enduring identification 8. In one embodiment, recorded network address 24 is then queried 50 by addressing a unique enduring identification query to recorded network address 24 and receiving the response to the query. In an alternative embodiment, recorded network address 24 is then queried 50 by performing an SNMP Get call to recorded network address 24.

If unique enduring identification 8 received from the query matches 52 recorded unique enduring identification 26, then object device 2 at recorded network address 24 is the expected device. If object device 2 is the expected device, then administrator 6 communicates 54 with object device 2 as desired. For example, administrator 6 may retrieve information from object device 2 or maintain object device 2.

If unique enduring identification 8 received from the query does not match 52 recorded unique enduring identification 26, then object device 2 at recorded network address 24 is not the expected device. If object device 2 is not the expected device, then administrator 6 resolves 56 the current network address for the expected device. In one embodiment, the current network address is resolved 56 by reading recorded hostname 28 from record 12 and retrieving the current network address for recorded hostname 28. For example, the current network address for recorded hostname 28 may be resolved 56 by looking it up in index 4.

In an alternative embodiment, the current network address is resolved 56 by reading recorded hardware address 30, sending an network multicast request for hardware addresses 10, receiving responses to the network multicast, searching the responses for a response having a match to recorded hardware address 30, and extracting the current network address from the response having a match to the recorded hardware address 30. If no match is resolved 56 in the responses to recorded hardware address 30, the multicast may be repeated as many times as desired or until a match is found.

After the current network address is resolved 56 for object device 2, recorded IP address 24 is replaced with the current network address. The process is then repeated as necessary to verify the correctness of the recorded network address. Additionally, the process may be repeated for each object device 2 represented in record 12.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for correcting a network address for an object device, the method comprising:
   (a) reading, from a record, a recorded network address and a recorded unique enduring identification for the object device;
   (b) querying the recorded network address for a returned unique enduring identification;
   (c) comparing the returned unique enduring identification received from querying the recorded network address for the object device with the recorded unique enduring identification for the object device; and,
   (d) responsive to a mismatch between the returned unique enduring identification and the recorded unique enduring identification, finding a current network address for the object device and replacing the recorded network address with the current network address.

2. The method of claim 1 wherein querying the recorded network address for a returned unique enduring identification includes:
   (a) addressing a unique enduring identification query to the recorded network address; and,
   (b) receiving the response to the query.

3. The method of claim 1 wherein querying the recorded network address for a returned unique enduring identification includes performing an SNMP Get call to the recorded network address.

4. The method of claim 1 wherein finding a current network address for the object device includes:
   (a) reading, from the record, a recorded hostname for the object device; and,
   (b) retrieving the current network address for the recorded hostname.

5. The method of claim 1 wherein finding a current network address for the object device includes:
   (a) reading, from the record, a recorded hardware address for the object device;
   (b) sending an network multicast request for hardware addresses;
   (c) receiving responses to the network multicast for hardware addresses;
   (d) searching the responses for a response having a match to the recorded hardware address; and, (e) extracting the current network address from the response having a match to the recorded hardware address.

6. The method of claim 5 further including iteratively repeating steps (b) through (d) until a match to the recorded hardware address is found in the responses.

7. The method of claim 1 further including iteratively repeating steps (b) through (d) until a match occurs between the returned unique enduring identification and the recorded unique enduring identification.

8. A system for correcting a network address for an object device, the system comprising:

(a) a record having a recorded network address and a recorded unique enduring identification for an object device;

(b) a reader configured to read, from the record, the recorded network address and the recorded unique enduring identification for the object device;

(c) an interrogator configured to query the recorded network address for a returned unique enduring identification;

(d) a comparator configured to compare the returned unique enduring identification received from querying the recorded network address for the object device with the recorded unique enduring identification for the object device; and, (e) a rectifier configured to respond to a mismatch between the returned unique enduring identification and the recorded unique enduring identification, by finding a current network address for the object device and replacing the recorded network address with the current network address.

9. The system of claim 8 wherein the investigator includes:

(a) a dispatcher configured to address a unique enduring identification query to the recorded network address; and, (b) a receiver configured to receive the response to the query.

10. The system of claim 8 wherein the investigator includes a manager configured to perform an SNMP Get call to the recorded network address.

11. The system of claim 8 wherein:

(a) the record further includes a recorded hostname for the object device;

(b) the reader is further configured to read, from the record, a recorded hostname for the object device; and, (c) wherein the rectifier includes a retriever configured to retrieve the current network address for the recorded hostname.

12. The system of claim 8 wherein:

(a) the record further includes a recorded hardware address for the object device;

(b) the reader is further configured to read, from the record, a recorded hardware address for the object device; and, (c) the rectifier includes:

(i) a broadcaster configured to send a network multicast request for hardware addresses;

(ii) a listener configured to receive responses to the network multicast for hardware addresses;

(ii) an investigator configured to search the responses for a response having a match to the recorded hardware address; and (iv) an extractor configured to extract the current network address from the response having a match to the recorded hardware address.

13. A program storage device readable by a computer, tangibly embodying a program, applet, or instructions executable by the computer to perform method steps for correcting a network address for a object device, the method steps comprising:

(a) reading, from a record, a recorded network address and a recorded unique enduring identification for the object device;

(b) querying the recorded network address for a returned unique enduring identification;

(c) comparing the returned unique enduring identification received from querying the recorded network address for the object device with the recorded unique enduring identification for the object device; and, (d) responsive to a mismatch between the returned unique enduring identification and the recorded unique enduring identification, finding a current network address for the object device and replacing the recorded network address with the current network address.

14. The program storage device of claim 13 wherein the method step of querying the recorded network address for a returned unique enduring identification includes:

(a) addressing a unique enduring identification query to the recorded network address; and, (b) receiving the response to the query.

15. The program storage device of claim 13 wherein the method step of querying the recorded network address for a returned unique enduring identification includes performing an SNMP Get call to the recorded network address.

16. The program storage device of claim 13 wherein the method step of finding a current network address for the object device includes:

(a) reading, from the record, a recorded hostname for the object device; and, (b) retrieving the current network address for the recorded hostname.

17. The program storage device of claim 13 wherein the method step of finding a current network address for the object device includes:

(a) reading, from the record, a recorded hardware address for the object device;

(b) sending a network multicast request for hardware addresses;

(c) receiving responses to the network multicast for hardware addresses;

(d) searching the responses for a response having a match to the recorded hardware address; and, (e) extracting the current network address from the response having a match to the recorded hardware address.

18. The program storage device of claim 17 wherein the method steps further included iteratively repeating steps (b) through (d) until a match to the recorded hardware address is found in the responses.

19. The program storage device of claim 13 wherein the method steps further included iteratively repeating steps (b) through (d) until a match occurs between the returned unique enduring identification and the recorded unique enduring identification.

* * * * *

UNITED STATES PATENT AND TRADEMARK OFFICE
CERTIFICATE OF CORRECTION

PATENT NO. : 6,865,603 B2 Page 1 of 1
DATED : March 8, 2005
INVENTOR(S) : Janz et al.

It is certified that error appears in the above-identified patent and that said Letters Patent is hereby corrected as shown below:

<u>Column 5,</u>
Line 65, delete "(ii)" and insert therefor -- (iii) --.

Signed and Sealed this

Thirteenth Day of December, 2005

JON W. DUDAS
*Director of the United States Patent and Trademark Office*